No. 608,029. Patented July 26, 1898.
T. COLDWELL.
GRASS COLLECTOR FOR LAWN MOWERS.
(Application filed Feb. 23 1898.)
(No Model.)
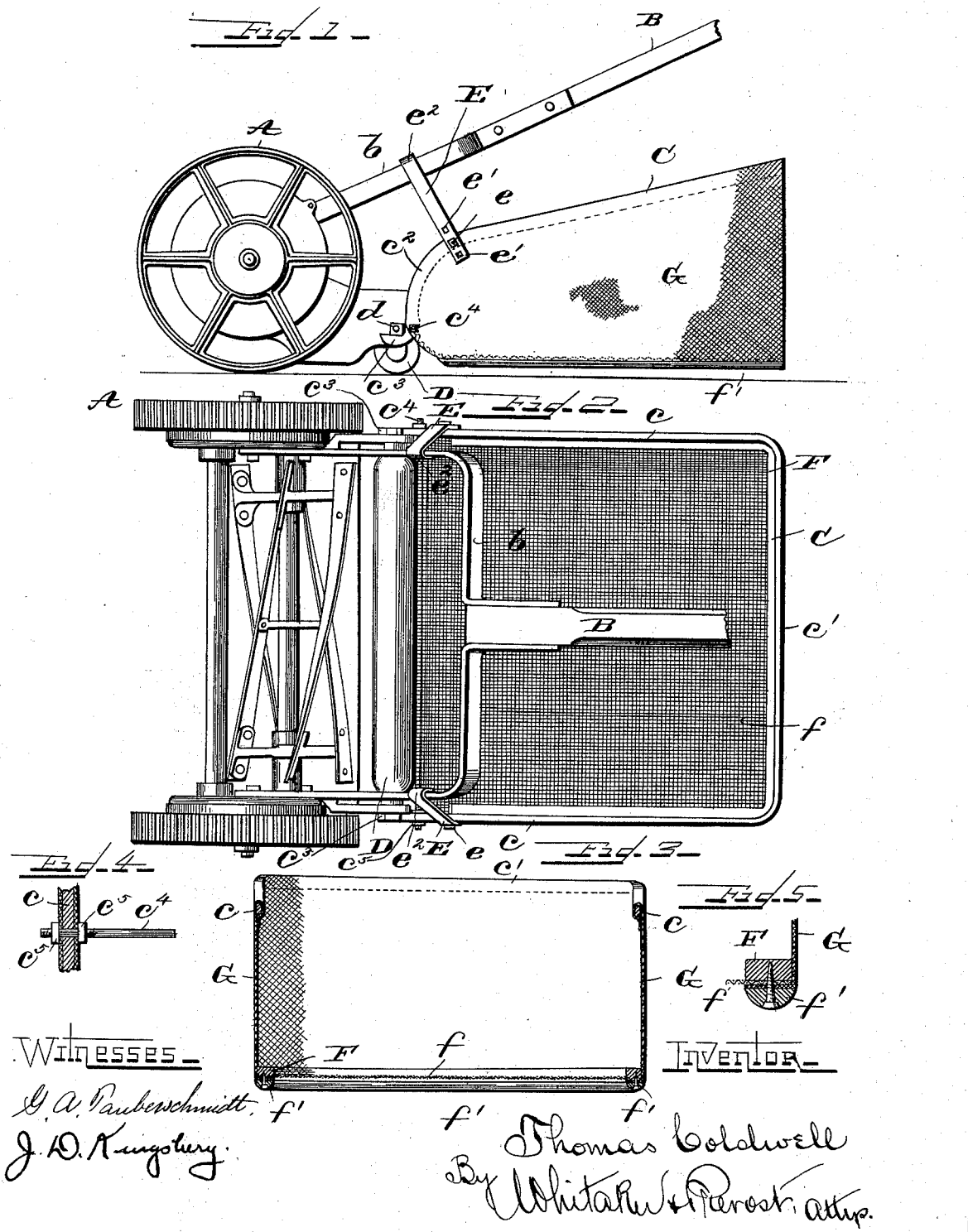

UNITED STATES PATENT OFFICE.

THOMAS COLDWELL, OF NEWBURG, NEW YORK.

GRASS-COLLECTOR FOR LAWN-MOWERS.

SPECIFICATION forming part of Letters Patent No. 608,029, dated July 26, 1898.

Application filed February 23, 1898. Serial No. 671,299. (No model.)

*To all whom it may concern:*

Be it known that I, THOMAS COLDWELL, a citizen of the United States, residing at Newburg, in the county of Orange and State of New York, have invented certain new and useful Improvements in Grass-Collectors for Lawn-Mowers; and I do hereby declare the following to be a full, clear, and exact description of the invention, such as will enable others skilled in the art to which it appertains to make and use the same.

My invention is an improvement in grass-collectors for lawn-mowers; and it consists in the novel features hereinafter set forth, reference being had to the accompanying drawings, which illustrate one form in which I have contemplated embodying my invention, and said invention is fully disclosed in the following description and claims.

Referring to the drawings, Figure 1 represents a side elevation of a lawn-mower with my improved grass-collector attached thereto. Fig. 2 is a top plan view of the same. Fig. 3 is a vertical transverse section of the grass-collector. Fig. 4 is a detail view showing the manner of attaching the adjustable cross-bar to the front portions of the supporting-frame; and Fig. 5 is a detail sectional view showing a portion of the bottom frame, side portions, and the runner.

The object of my invention is to provide an extremely light, strong, and durable grass-collector which can be instantly attached to and detached from the mower and which cannot be accidentally detached therefrom while in use.

In the drawings, A represents a lawn-mower of any usual or preferred construction, provided with a handle B, which is attached to the machine by means of the usual bail $b$.

C represents the supporting-frame of the grass-collector, which is formed in one piece from a flat bar of iron or steel and is bent to form the side pieces $c\ c$ and rear end piece $c'$. The front portions of the side pieces $c$ are bent downwardly, as shown at $c^2$, and at their lower extremities are again bent forwardly to form the horizontal nose or hook portion $c^3$. This nose $c^3$ is adapted to engage the under side of the bolt-head or nut $d$, which secures the sod-roller D of the lawn-mower adjustably in position in a well-known way, and, as shown in Fig. 1, the said nose $c^3$ at each side of the machine will engage the under side of the bolt-head or nut $d$, while the adjacent vertical portion of the bar C will engage the rear edge of said bolt-head or nut. In order to prevent the forward ends of the side pieces $c\ c$ from moving laterally, I connect them by means of a cross-bar $c^4$, (see Figs. 1, 2, and 4,) which is rigidly secured to the said end pieces and holds them at such a distance apart that they will engage the outer faces of the side frames of the lawn-mower, and will thus be prevented from moving laterally to disengage them from the bolt-heads or nuts $d$. This cross-bar $c^4$ may be riveted or otherwise permanently secured in place; but, as shown in Fig. 4, I prefer to provide it at each end with a nut on the inner side and a nut on the outer side of the side piece $c$, as shown at $c^5\ c^5$, in order to permit the device to be adjusted slightly to accommodate slight variations in the widths of the machines with which it is used. Each of the side pieces $c$ is provided adjacent to the curved portion $c^2$ thereof with a bolt-hole, preferably squared, to receive a square-shanked bolt $e$, to which is attached the bail-engaging arm E. This arm is provided with a series of apertures $e'$, preferably square, for engaging the bolt $e$, and at its upper end said arm is provided with a hook portion $e^2$, adapted to fit over the bail $b$, as shown in Fig. 2.

The bottom of the grass-collector consists of a rectangular frame F, which is formed preferably of wood, and the bottom $f$, which is preferably of wire-netting secured to said frame. The sides of the device are composed of flexible material, preferably canvas, which is secured at its upper edge to the supporting frame or bar C and at its lower end is secured to the bottom frame F. I prefer to turn the lower edges of the canvas G under the bottom frame F either above or below the wire-netting bottom and to provide the frame F with light metal bars $f'$, secured thereto by nails or screws and clamping the edges of the canvas sides and the bottom $f$ between the frame F and said bars $f'$. (See Figs. 3 and 5.) The metal bars $f'$ are preferably curved on their lower faces, as shown, and form runners which protect the sides and bottom of the device from wear. It is obvious that the bars $f'$ could be made from a single piece bent in rectangular form to engage the bottom of the frame F, if desired.

To place the grass-collector in operative position on the mower, the front end is inclined downwardly and the nose $c^3$ of each side piece is placed beneath the bolt-head or nut $d$ on the mower, when by lowering the rear end of the device the hook portions $e^2$ of the bail-engaging arms will grasp the bail and support the device in operative position. To remove it, it is only necessary to raise the rear end of the supporting-frame C sufficiently to enable the hooks $e^2$ to disengage the bail, when the device can be withdrawn rearwardly.

As will be seen, the device is extremely simple in construction, can be made cheaply, and can be instantly attached to or removed from the mower. It will also be noted that no change in the construction of the mower is necessary to accommodate the grass-collector, as it is entirely supported by the engagement of the arms E with the bail and the portions $c^3$ with the bolt-heads or nuts $d$.

As the sides of the device are flexible, the bottom is free to rise and fall in passing over obstructions or elevations of the ground without in any way affecting the position of the supporting-frame C or its connection with the mower. The supporting-frame C is also made of one piece, and all braces and other auxiliary devices are dispensed with.

As the bottom frame F will ordinarily lie below the portions $c^3$ of the supporting-frame, the wire-netting $f$ is preferably continued upward at its front edge to the cross-bar $c^4$, (see Fig. 1,) to which it may be secured in any desired manner; but this is not essential.

What I claim, and desire to secure by Letters Patent, is—

1. A grass-collector for lawn-mowers, having a supporting-frame, adjacent to its upper edges, provided with bail-engaging arms having hooks for detachably engaging the bail of the mower, said frame having at its forward end, portions extending downwardly and horizontally to form a horizontal nose at each side to engage the under side of a part of the mower structure and side and bottom portions supported by said supporting-frame, whereby said device can be instantly detached from the mower by elevating the rear end of said supporting-frame and drawing it rearwardly, substantially as described.

2. A grass-collector for lawn-mowers having a supporting-frame adjacent to its upper edges, consisting of a single bar bent to form the transverse rear portion, and forwardly-extending side pieces the forward ends of said side pieces extending downwardly and horizontally to form a horizontal nose at each side of the device to engage the under side of a part of the mower structure, bail-engaging arms secured to said side pieces, and having hooks for detachably engaging the bail of the mower, and side and bottom portions supported by said supporting-frame, whereby said device can be instantly detached from the mower by elevating the rear end of said supporting-frame, and drawing it rearwardly, substantially as described.

3. A grass-collector for lawn-mowers having a supporting-frame adjacent to its upper edges, consisting of a single bar bent to form the transverse rear portion, and forwardly-extending side pieces, the forward ends of said side pieces extending downwardly and horizontally to form a horizontal nose at each side of the device to engage the under side of a part of the mower structure, bail-engaging arms secured to said side pieces, and having hooks for detachably engaging the bail of the mower, a bottom frame provided with a bottom and a flexible side portion connecting the bottom frame and the said supporting-frame, whereby said bottom is free to move vertically without affecting the engagement of the said bail-engaging hooks, or said horizontal nose portions with the mower, substantially as described.

4. A grass-collector for lawn-mowers provided with a supporting-frame composed of a single bar bent to form the transverse rear portion and the forwardly-extending side pieces, the forward ends of said side pieces being bent downwardly and horizontally to form a horizontal nose on each side of the device, to engage the under side of a part of the mower structure, bail-engaging arms secured to the forward portions of said side pieces, in rear of the said mower-engaging portions, the bottom frame provided with a wire-netting bottom, flexible sides secured to the supporting-frame, and having their lower edges secured to the bottom frame and metal strips secured to the bottom frame clamping portions of the bottom and side portions between them and the bottom frame and forming runners to protect the bottom and side portions from wear, substantially as described.

In testimony whereof I affix my signature in the presence of two witnesses.

THOMAS COLDWELL.

Witnesses:
JOHN W. TAYNTOR,
E. J. PERRY.